ns directly.

United States Patent
Conn

[15] 3,692,825
[45] Sept. 19, 1972

[54] INDANYL ACETIC ACIDS
[72] Inventor: John B. Conn, Westfield, N.J.
[73] Assignee: Merck & Co., Inc. Rahway, N.J.
[22] Filed: May 1, 1970
[21] Appl. No.: 33,893

[52] U.S. Cl. ............................260/515 A, 260/465 D
[51] Int. Cl. ..............................................C07c 147/00
[58] Field of Search ..................................260/515 A

[56] References Cited
OTHER PUBLICATIONS
Arnold et al., J. Amer. Chem. Soc. Vol. 61 (1939), pages 1407–1408

*Primary Examiner*—James A. Patten
*Attorney*—Martin L. Katz, Harry E. Westlake, Jr. and I. Louis Wolk

[57] ABSTRACT

Process for preparing 1-benzylidene-5-fluoro-3-indenyl acetic acids by 2,3-dehydrogenating a 1-benzylidene-3-indanyl acetic acid. Also included are novel 1-benzylidene-3-indanyl acetic acid intermediates.

2 Claims, No Drawings

INDANYL ACETIC ACIDS

This invention relates to a process for preparing novel 5-fluoro-2-methyl-1-(p-methylsulfinylbenzylidene)-3-indenyl acetic acid. This compound has anti-inflammatory, anti-pyretic and analgesic activity and is useful in the treatment of diseases which exhibit pain, fever or inflammation. In the treatment of such diseases, 5-fluoro-2-methyl-1-(p-methylsulfinylbenzylidene)-3-indenyl acetic acid may be administered topically, orally, rectally or parenterally in dosage ranges of from about 0.1 mg. to 50 mg./kg. body weight per day (preferably from about 1 mg. to 15 mg./kg. body weight per day).

In the past, other 1-benzylidene-3-indenyl acetic acids have been prepared by condensing a substituted benzaldehyde with a substituted acetic acid ester in a Claisen Reaction or with an α-halogenated propionic acid ester in a Reformatsky Reaction. The resulting unsaturated ester was reduced and hydrolyzed to give a β-aryl propionic acid which was ring closed to form an indanone. The aliphatic acid side chain was then introduced by a Reformatsky or Wittig Reaction and the 1-substituent was introduced into the resultant indenyl acetic acid or ester by reacting said acetic acid derivative with an aromatic aldehyde or ketone of the desired structural formula and dehydrating to form the desired indenyl acetic acid.

It is an object of this invention to provide a new process for preparing 5-fluoro-2-methyl-1-(p-methylsulfinylbenzylidene)-3-indenyl acetic acid. It is a further object of this invention to provide a new process for preparing this compound in which a 3-indanyl acetic acid is 2,3-dehydrogenated as a last step in the preparation of 5-fluoro-2-methyl-1-(p-methylsulfinylbenzylidene)-3-indenyl acetic acid. It is still a further object of this invention to provide novel 3-indanyl acetic acids which are useful in the preparation of 3-indenyl acetic acids. Other objects will become apparent hereinafter.

In accordance with this invention, it has been discovered that 5-fluoro-2-methyl-1-(p-methylsulfinylbenzylidene)-3-indenyl acetic acid can be prepared by adding the indanyl acetic acid to an aromatic solvent such as benzene, xylene, phenetole, anisole, or the like, methylene chloride, or to acetic acid (preferably methylene chloride and adding 1 to 5 moles of chloranil (preferably 2 moles of chloranil) to 1 mole of the indanyl acetic acid solution. This reaction mixture is maintained at a temperature between 60°-190° C., (preferably at reflux of the solvent) for 1 to 3 hours. Alternatively, the oxidation can be carried out by means of previously deactivated Raney nickel in boiling xylene, 10 percent palladium on charcoal in boiling decalin, Triton B in pyridine or selenium without the use of solvents. Recrystallization from water-alcohol yields the cis-isomer of 5-fluoro-2-methyl-1-(p-methylsulfinylbenzylidene)-3-indenyl acetic acid.

The starting material for the process of the present invention may be prepared by acetylating 2-fluoro-4-nitroaniline, cyclizing the resulting product to form 2-methyl-3-cyanomethyl-4-acetamido-5fluoro-7-nitroindanone which is deacetylated, diazotized, deaminated and hydrolized to form 5-fluoro-1-keto-2-methyl-3-indanyl acetic acid which is condensed with 4-methylsulfinylbenzylidenetriphenyl-phosphine to form 5-fluoro-2-methyl-1-(p-methylsulfinylbenzylidene)-3-indanyl acetic acid.

It should be noted by one skilled in the art that 5-fluoro-2-methyl-1-(p-methylsulfinylbenzylidene)-3-indenyl acetic acid may be isomerized into its cis and trans isomers by procedures well known in the art. The cis isomer is that isomeric form in which the benzylidene function is aligned under the phenyl ring of the indene nucleus. It should be further noted that the cis isomer is substantially more active than the trans isomer.

It should be further noted by one skilled in the art that cis-5-fluoro-2-methyl-1-(p-methylsulfinylbenzylidene)-3-indenyl acetic acid is asymmetric and may be resolved into its (+) and (−) forms by procedures well known in the art.

It should be further noted by one skilled in the art that this compound is polymorphic and has more than one crystalline structure.

The following example is presented to further illustrate the present invention.

EXAMPLE

A. 2-Methyl-3-cyanomethyl-4-acetamido-5-fluoro-7-nitroindanone

2-Fluoro-4-nitroaniline (312 g., 2 moles) is acetylated by digestion in 500 g. acetic anhydride. The product is poured into 2l. water, filtered, dried, and charged to a 5l. flask fitted with high-speed stirrer, gas inlet and outlet tubes, and a dropping funnel, set up in the hood. Anhydrous nitromethane (2.5l.) is added, followed by 266 g. (2 moles) anhydrous aluminum chloride, sifted in at such a rate as permits heat to dissipate. The system is closed, and the dropping funnel is charged with 482 g. (2 moles) 3,4-dibromovaleronitrile (prepared by bromination of 3-pentenenitrile in methylene chloride) dissolved in 500 ml. anhydrous nitromethane. Under vigorous sitrring, carbon monoxide is passed in at a brisk rate, while the bromo compound is added dropwise. When no more hydrogen bromide is swept out with the carbon monoxide, the dark reaction mixture is cautiously poured into 5l. ice-water. The nitromethane layer is separated, washed free from hydrohalic acid, then saturated with anhydrous calcium chloride to remove water. Nitromethane is removed under reduced pressure, and the residue is dissolved in benzene, clarified with charcoal, and chromatographed upon alumina to separate 2-methyl-3-cyanomethyl-4-acetamido-5-fluoro-7-nitroindanone from isomers.

B. 2-Methyl-3-cyanomethyl-4-acetamido-5-fluoro-7-aminoindanone

The product of Step A, (76.6 g., 0.25 mole) is dissolved in 1 l. of 50 percent alcohol, and under vigorous stirring, 160 g. sodium hydrosulfite is added. When the yellow color of 2-methyl-3-cyanomethyl-4-acetamide-5-fluoro-7-nitroindanone has disappeared, alcohol is evaporated under reduced pressure at 30°-35° C., and the precipitate of 2-methyl-3-cyanomethyl-4-acetamido-5-fluoro-7-aminoindanone is filtered, washed thoroughly with water, and used in the next step.

C. 2-Methyl-3-cyanomethyl-4-acetamido-5-fluoroindanone

The product of Step B is dissolved in 300 ml. 2.5N hydrochloric acid and mixed with 300g. ice. Under good stirring the mixture is diazotized with a concentrated solution of 17.5 g. (0.25 mole) sodium nitrite added dropwise. At the first permanent starch-iodide test, the excess nitrous acid is destroyed with urea, and the diazonium solution is poured into a mixture of 410 g. 50 percent hypophosphorus acid and 100 g. ice with vigorous stirring. 2-Methyl-3-cyanomethyl-4-acetamido-5-fluoroindanone soon begins to separate with evolution of nitrogen. Stirring is continued for 24 hours at 0° C., it is then filtered, the precipitate is washed, dried, and recrystallized from benzene-hexane.

D. 5-Fluoro-1keto-2-methyl-3-indanyl acetic acid

The product of the previous step is cooked for 2 hours on a steam bath in 250 ml. of 4N sulfuric acid. Under good stirring, the mixture is diazotized with a concentrated solution of 14.0 g. (0.2 mole) sodium nitrite added dropwise. The excess nitrous acid is destroyed with urea, and the diazonium solution is poured into a mixture of 322 g. of 50 percent hypophosporous acid and 80 g. of ice with vigorous stirring. 5-Fluoro-1-keto-2-methyl-3-indanyl acetic acid soon begins to separate with the evolution of nitrogen. Stirring is continued for 24 hours at 0°C., and the product is then filtered and recrystallized from benzene hexane.

E. 5-Fluoro-2-methyl-1-(p-methylsulfinylbenzylidene)-3-indanyl acetic acid

The product of the previous step is condensed with 4-methylsulfinylbenzylidene-triphenylphosphine. The mixture is allowed to stand for 2 hours. The product is quenched in water, filtered, dried, extracted with water and recrystallized from glacial acetic acid-water.

F. 5-Fluoro-2-methyl-1-(p-methylsulfinylbenzylidene)-3-indenyl acetic acid

The product of the previous step (17.8 g., 0.05 mole) is warmed with 7.09 g. chloranil in methylene chloride, the solvent is removed and the product is separated by digestion with aqueous acetic acid.

What is claimed is:

1. 5-Fluoro-2-methyl-1-(p-methylsulfinylbenzylidene)-3-indanyl acetic acid.
2. The cis-isomer of a compound as in claim 1.

* * * * *